C. C. BROOKS AND E. O. KLEMM.
AUTOMATIC STOP AND REPEATING MEANS FOR GRAPHOPHONES.
APPLICATION FILED MAY 29, 1917. RENEWED NOV. 9, 1921.
1,406,606.
Patented Feb. 14, 1922.
5 SHEETS—SHEET 3.
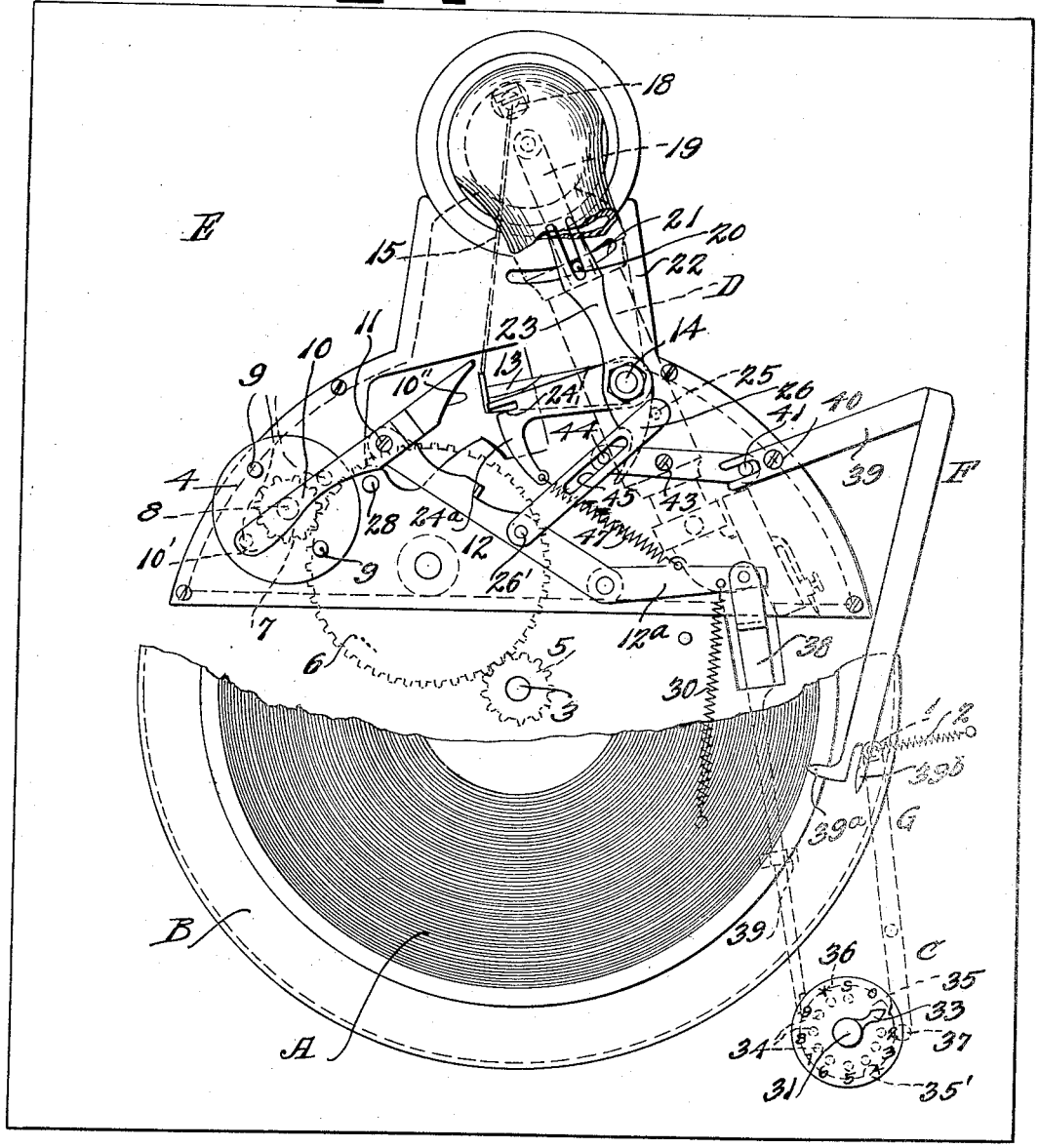
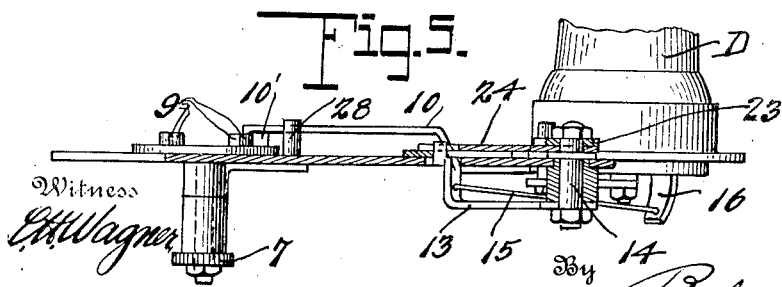

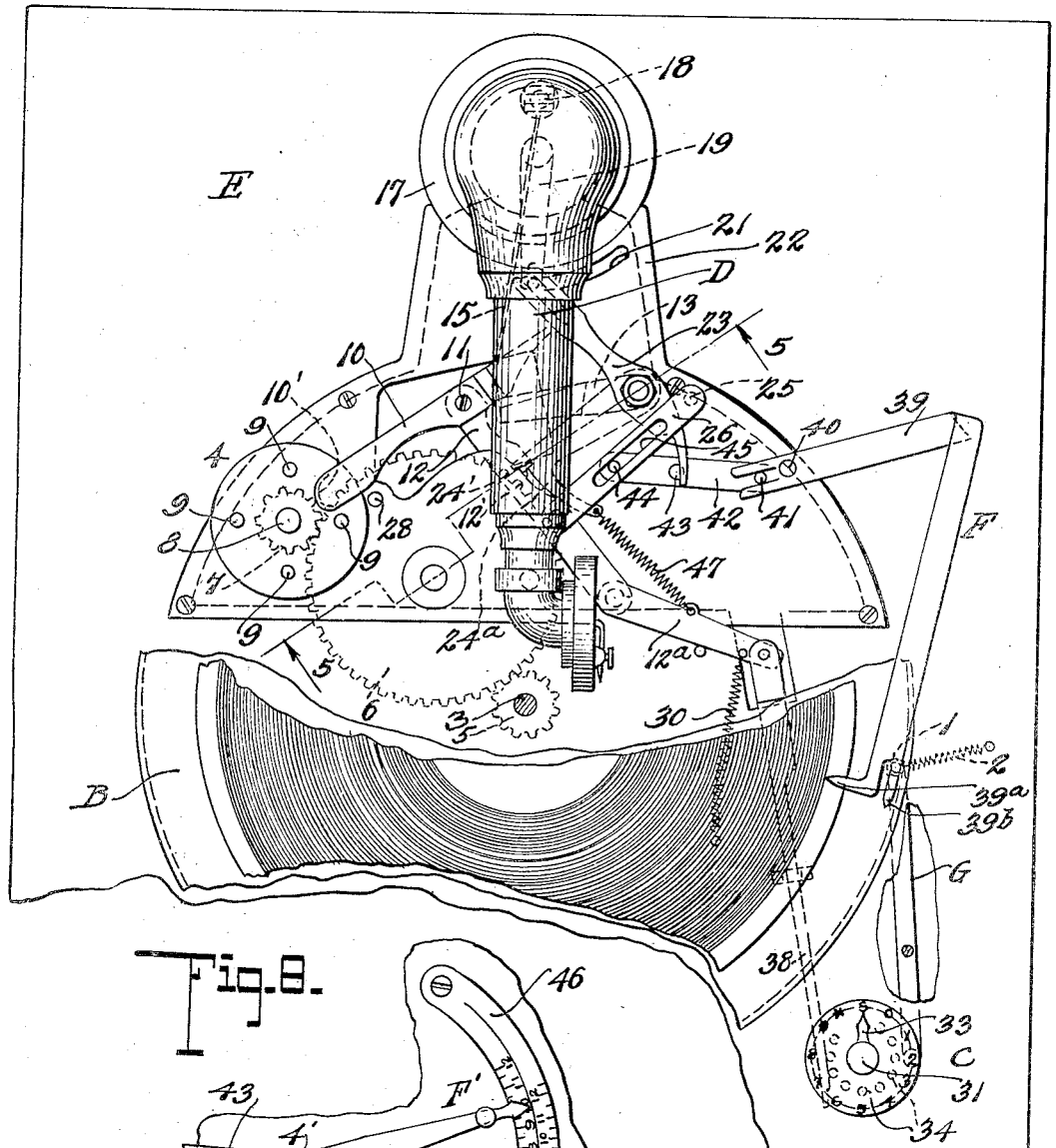

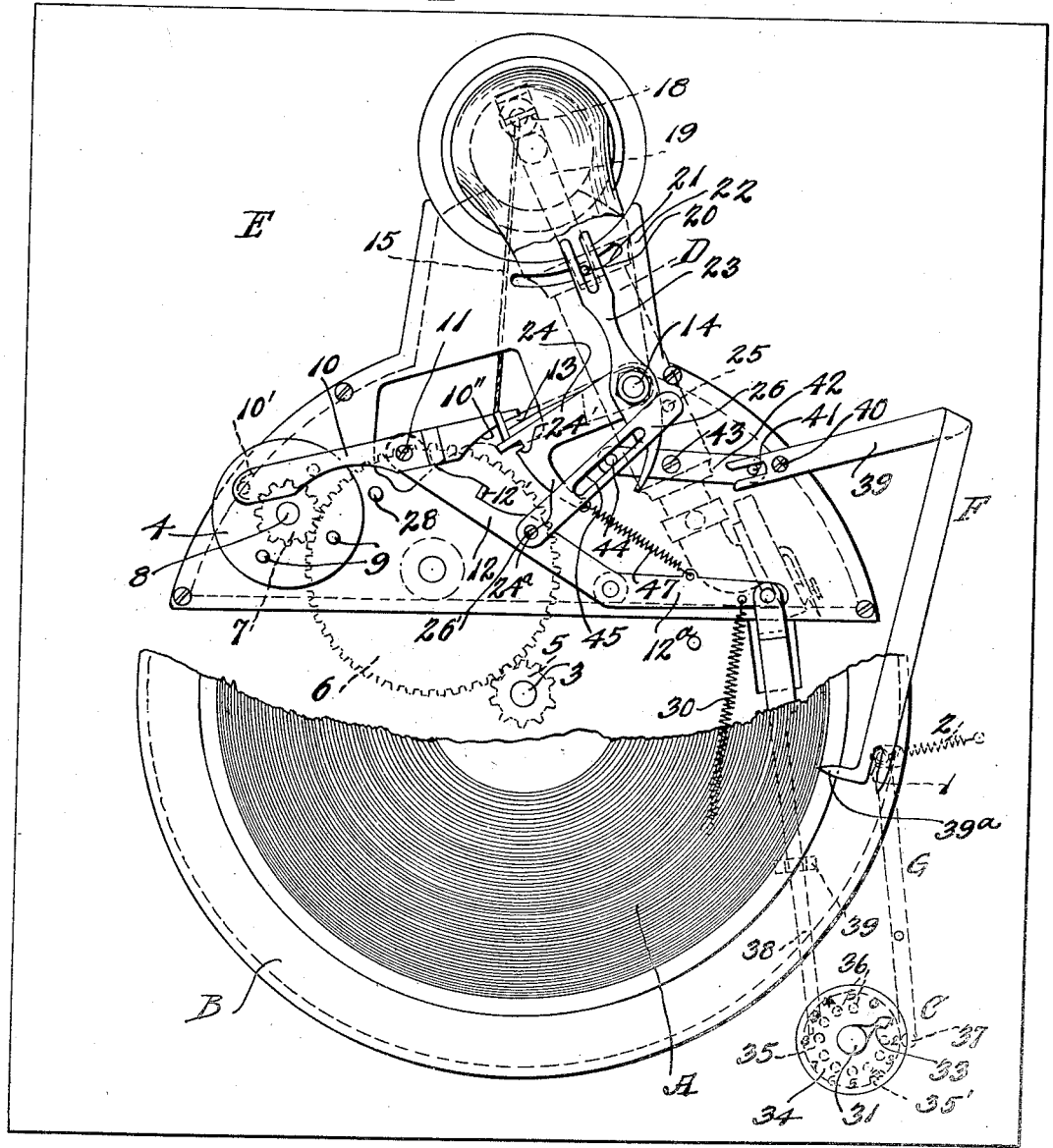

C. C. BROOKS AND E. O. KLEMM.
AUTOMATIC STOP AND REPEATING MEANS FOR GRAPHOPHONES.
APPLICATION FILED MAY 29, 1917. RENEWED NOV. 9, 1921.
1,406,606.
Patented Feb. 14, 1922.
5 SHEETS—SHEET 4.
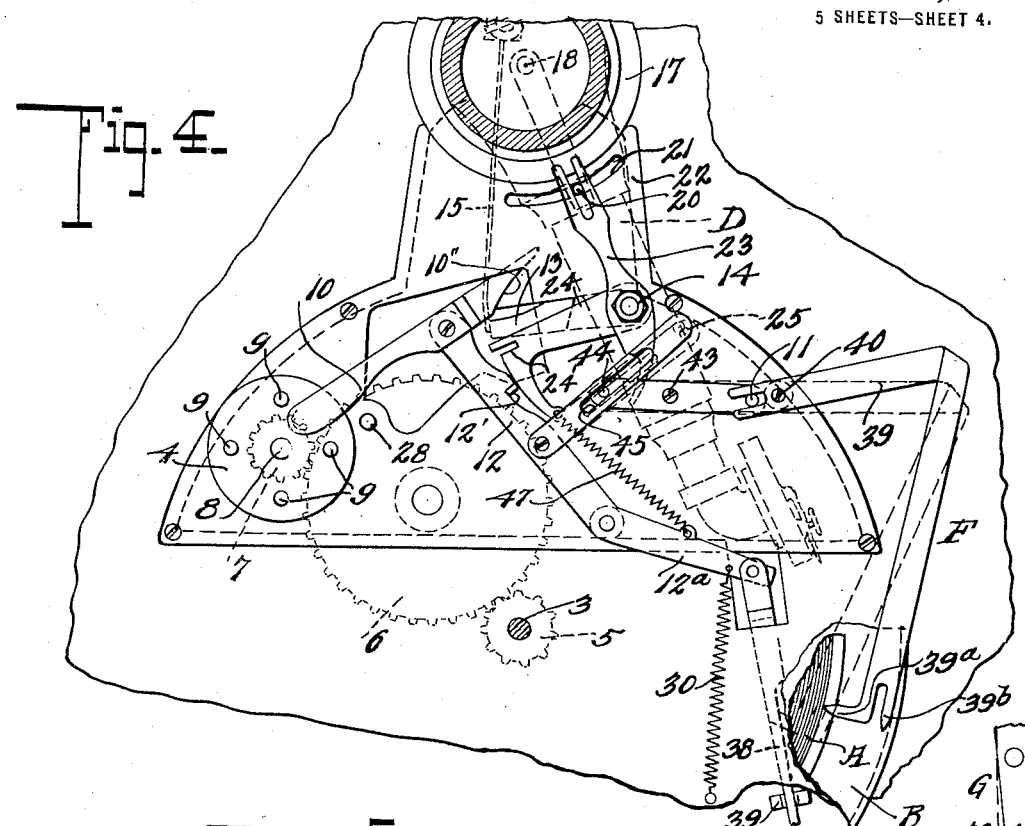
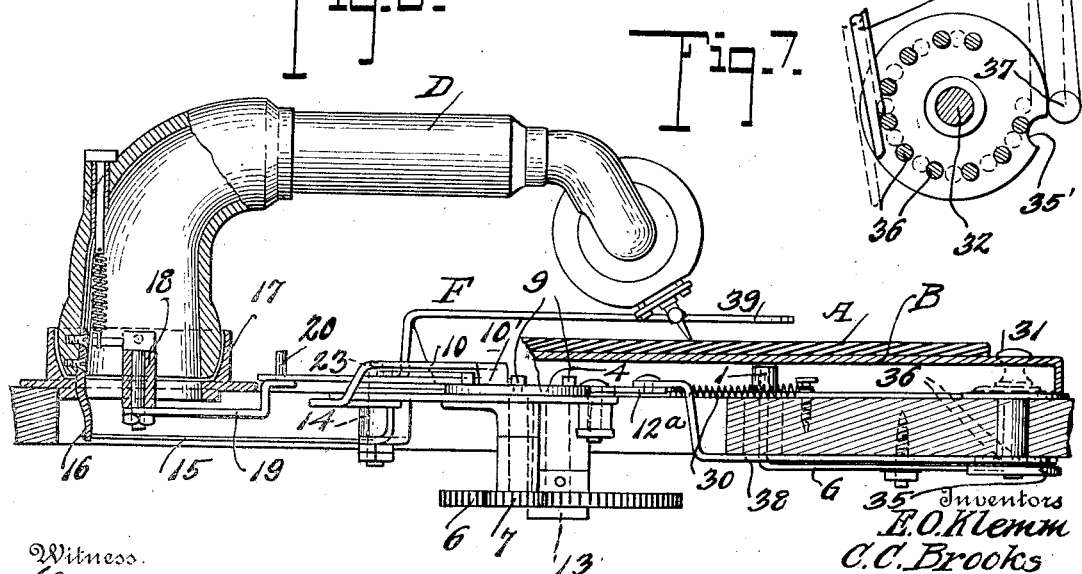

C. C. BROOKS AND E. O. KLEMM.
AUTOMATIC STOP AND REPEATING MEANS FOR GRAPHOPHONES.
APPLICATION FILED MAY 29, 1917. RENEWED NOV. 9, 1921.
1,406,606.
Patented Feb. 14, 1922.
5 SHEETS—SHEET 5.
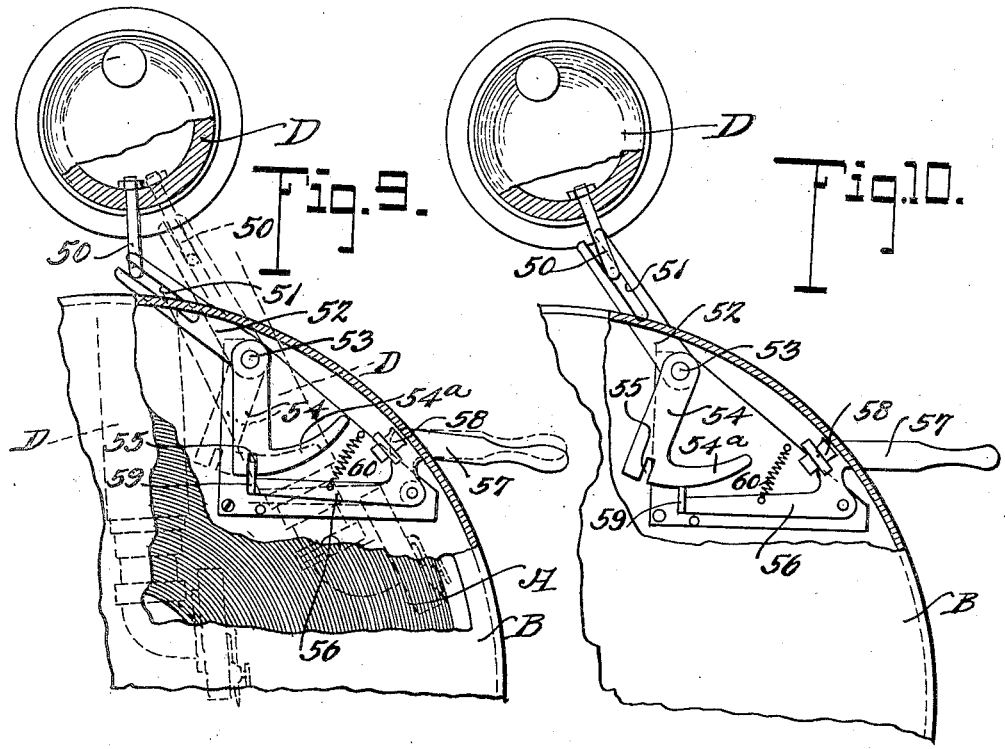
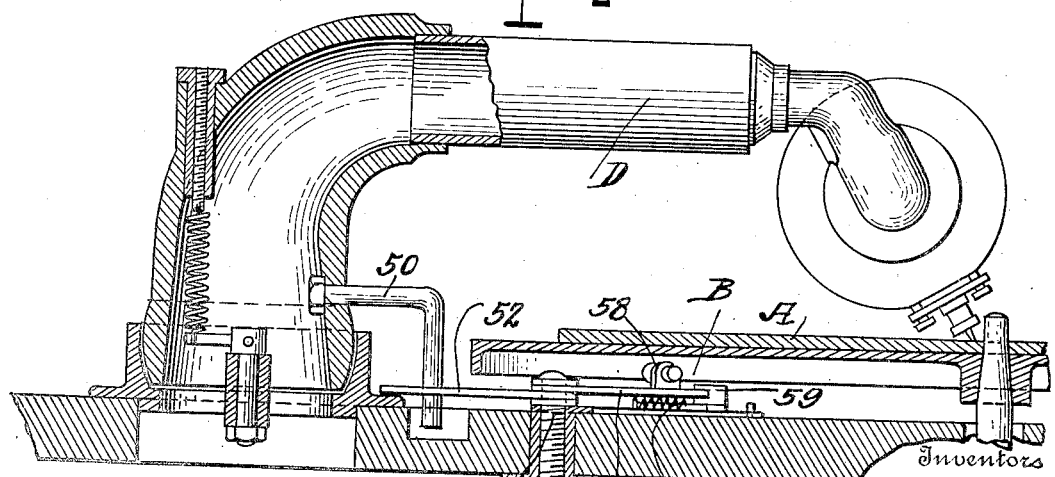

UNITED STATES PATENT OFFICE.

CLIFFORD C. BROOKS AND EDWIN O. KLEMM, OF FENTON, MICHIGAN, ASSIGNORS TO KLEMM MANUFACTURING COMPANY, OF SAGINAW, MICHIGAN.

AUTOMATIC STOP AND REPEATING MEANS FOR GRAPHOPHONES.

1,406,606. Specification of Letters Patent. Patented Feb. 14, 1922.

Application filed May 29, 1917, Serial No. 171,791. Renewed November 9, 1921. Serial No. 514,121.

*To all whom it may concern:*

Be it known that we, CLIFFORD C. BROOKS and EDWIN O. KLEMM, citizens of the United States, residing at Fenton, in the county of Genesee and State of Michigan, have invented certain new and useful Improvements in Automatic Stop and Repeating Means for Graphophones, of which the following is a specification.

This invention has to do with certain improved automatic stopping and repeating mechanism for sound reproducing machines of a type which has been heretofore proposed by us and in which are preferably employed a series of controlling and operating units including: First, an operation predetermining device; second, an actuating device for the sound reproducing or tone arm which is shiftable across the record in the reproducing action as usual; third, a reproduction commencement point controlling device which governs the reproduction starting point of the reproducing stylus in cooperation with the sound record; and, fourth, an adjustable trip adapted to be set to govern the point of stopping of sound reproduction if the operation of the machine is predetermined to be automatically stopped, or the point at which a traverse of the sound reproducing stylus ceases momentarily and is then caused to repeat.

While the invention resides in various improvements in the several units of controlling instrumentalities above summarized, and in different combinations of these instrumentalities, an especial object of the invention has been to produce a general mechanism of the type set forth wherein the action of the various parts is rendered positive, and wherein the parts themselves are of such a construction that practically all of them may be readily stamped from sheet metal so as to materially cheapen the manufacture of the stopping and repeating mechanism as compared with the type heretofore proposed by us.

A further and essential object of the invention has been to improve especially the construction of the trip means referred to as one of the main units of the controlling mechanism, said trip means in the present instance being cooperative with but supported entirely independently of the reproducing arm, and having a variable action which is especially advantageous for reasons that will be hereinafter pointed out. Furthermore, in our present construction of the commencement point controlling device we have employed a special form of manipulable controller adapted to cooperate directly with the record in its preferred construction to enable the operator to position it with remarkable accuracy in order to predetermine the point of commencement of reproduction of sound incident to cooperation of the reproducing stylus with the record, whether this commencement involves the first reproduction of a particular record, or a repeated reproduction. The commencement point controlling member has likewise been devised to coact with the trip or timing means in such a way that said member is susceptible of being adjusted both previous to or during the actual reproducing of the sound in the operation of the machine. Owing to this feature it is possible for the operator to set the commencement point controller without waiting until the tone arm reaches any particular point in its reproducing movement, a practical requirement the merit of which is thought to be obvious.

In respect to the commencement point controller, furthermore, according to the present invention said controller constitutes an indicator which is adapted to advise the operator at all times, once set, just where the reproducing stylus will commence its sound reproducing action for original or repeated reproductions of a record. In addition, the said controller is so designed that it is adapted for ready adjustment not only as a controller but to perform its function as an indicator, in relation to adjustable reproducers such as are carried by certain tone arms of types of talking machines now being manufactured. This type of reproducer is adjustable to assume two different positions, one in which it is adapted to reproduce what are known as hill and dale records, and a second position to reproduce records of the lateral ditch type, as exemplified in principle by Shiff, U. S. Patent No. 1246474, issued November 13, 1917.

With the foregoing in mind, the reproduction commencement point controller of this invention may be to a certain extent termed a universal controller as regards its usefulness in regard to adjustable reproducers of the type referred to.

The operation predetermining device used in accordance with this invention has likewise been improved particularly with a view to facilitating a movement of said device in either of opposite directions in order to reach a set position as quickly as practicable and without unnecessary movement by the operator. In our previous construction of this feature of our invention the predetermining device could only be moved in a single direction.

It is to be understood, furthermore, that the operation predetermining device of this invention constitutes a registering means for advising the operator of the number of times a record or operation of a record has been played.

In the accompanying drawings:—

Figure 1 is a plan view partially broken away, showing a sound reproducing machine of a conventional type equipped with controlling, stopping and repeating mechanism of this invention, the record and turn table being broken away to illustrate more fully certain overlapped portions of the detail parts. In this view the tone arm is at the inner limit of its movement and the turn table is stopped.

Figure 2 is a view somewhat similar to Figure 1, showing the tone arm in dotted lines in sound reproduction commencement position, the point of commencement being that for an ordinary ten inch record and the brake mechanism being released as necessary for regular sound reproducing action of the machine. In this view the tone arm is still held uplifted, or in other words the reproducing stylus is not deposited upon the record.

Figure 3 is a view similar to Figure 2 excepting that the various controlling parts are in the various positions assumed thereby when the moving means for the tone arm has permitted lowering of said arm and depositing of the stylus on the smooth outermost portion of the record.

Figure 4 is a fragmentary view similar to those previously described, illustrating the cooperation of the parts when the reproducer is traversing the record toward its point of stopping or lifting for repeat action.

Figure 5 is a fragmentary sectional view taken on the line 5—5 of Figure 1.

Figure 6 is a sectional view with the tone arm partly in elevation, the section being taken vertically through the top board of the reproducing machine and bringing out the mounting and arrangement of certain levers and arms, especially those for actuating the tone arm to lift and swing the latter horizontally.

Figure 7 is an enlarged sectional detail bringing out more clearly the cooperation of the operating bar for the operation predetermining device or register in its relation to the latter.

Figure 8 is a fragmentary detail view in plan of a modified form of reproduction commencement point controller and indicator.

Figures 9 and 10 are plan views partly broken away and in section, illustrative of a modified form of reproduction discontinuing mechanism embodying certain principles of construction utilized in the preferred adaptation of the invention, the controlling means, however, being such as to require manual setting of the reproducer at the reproduction commencement point.

Figure 11 is a vertical sectional view showing more clearly the construction in Figures 9 and 10.

With a view to simplifying this description, the construction of the parts and the operation of the several units of mechanism will be described substantially in the order in which they come into play during a cycle of operation of the machine.

In the drawings, A shows a conventional form of flat record disposed upon a rotating table or platform B, the operation predetermining device being designated C, the tone arm D, and the top board of the sound reproducing machine E. The reproduction commencement point controller is shown at F and the brake lever at G.

Assuming that the brake lever G has been tilted to carry the shoe 1 thereof out of contact with the edge flange of the table B, against the tension of the coiled spring 2, the turn table B will obviously be released in the customary way and will start to revolve under the action of the customary motor. The turn table shaft 3 is adapted to actuate a driver in the form of a disk 4, by the provision of a train of gears 5, 6 and 7, the latter fixed on a shaft 8 carrying said disk 4. The disk 4 is equipped with a number of studs 9 any one of which is adapted under proper conditions to engage the flange 10' of the connector 10. The connector 10 is pivoted at 11 to a locking arm 12 and said connector has a cut-away end portion 10" capable of engaging the shifting arm 13 which is loosely mounted on the vertical shaft 14. The shifting arm 13 is connected by a flexible member, a cable 15, with a downwardly extending rigid projection 16, see Figures 5 and 6. When the connector 10 is engaged by one of the studs 9 and pulled outwardly from the position shown in Figure 1 to that shown in Figure 2, said connector is given a sort of rocking movement causing an inward movement of the shifting arm 13, exerting a pull on the cable 15, thereby raising the tone arm D which is free to move upwardly by reason of its ball and socket connection 17 with the top board E, this connection being best seen in Figure 6 and being conventional. Projecting from a central stub 18, see Figure 6, fixed to the pivoted portion of the arm D is a rigid arm 19 and said arm has a pin 20 at its free end, said pin operating in a slot 21 of a plate 22 fixed to the base or top board E and also engaging in a bifurcation of a lever 23 also mounted on the shaft 14 as an axis. The lever 23 is peculiarly connected frictionally with a trip or timing lever 24, see Figure 5 especially, the frictional connection being established so that under some conditions the parts 23 and 24 may move together and under other conditions the member 23 may move independently of the member 24.

At the present time we will assume that the parts 23 and 24 move together. The lever 24 has a notch 24' in its outer end and is formed with a detent extension 24ª at the same end. When the machine is stopped as seen in Figure 1, a lug 12' of the locking lever 12 engages in the notch 24' of the lever 24. However when the connector 10 is connected with the driver 4, on release of the turn table B said connector 10 not only actuates the shifting arm 13 to raise the tone arm D through the action of the cable 15, but at the same time the locking lever 12 is moved to disengage its lug 12' from the operation control or timing lever 24. Likewise practically at the same time, or momentarily after the lug 12' leaves the notch 24', a downwardly extending pin 25 carried by a slide or pivoted plate 26 is caused to engage with the inner end of the tone arm actuating lever 23, the latter being pivoted between its ends on the shaft 14. The slide 26, it may be noted, is connected at 26' with the locking lever 12 and motion is imparted from the connector 10 to the lever 23 through the parts 12 and 26, when the connector 10 is being operated by the driver or disk 4. The actuation of the lever 23 in the manner described, by the connector 10 and driver 4, shifts the outer bifurcated end of the lever 23 outwardly and since this end is permanently connected by the member 20, with the tone arm D it will be evident that the tone arm is adapted to be swung outwardly practically at the same time that it is raised, through the operation of the driving parts 4 and 10.

Thus far we have described the operation of releasing the turn table, automatically raising the tone arm D and automatically swinging said tone arm to the outer limit of its movement, the latter being predetermined by the reproduction commencement point, or repeat point controller F, as will be later set forth. The parts of the mechanism in operating to perform the above actions, are shifted as depicted in Figure 2 wherein they are being actuated, and finally assume the positions shown in Figure 3, the stylus of the reproducing arm D being upraised from the record A according to the positions of parts in Figure 2. It may be noted that when the tone arm actuating lever 23 is moving to shift the tone arm to the point of reproduction commencement, the frictional connection between the parts 23 and 24 causes the timing operation control or lever to be rocked outwardly from the position shown in Figure 1 to the position shown in Figure 3.

The depositing of the reproducing stylus upon the record A is accomplished owing to the peculiar rocking movement of the connector 10 as the latter is shifted from the position shown in Figure 1 to the position shown in Figure 4, it being noted that at a certain time in the rotation of the driving disk 4 the connector 10 engages with a stud 28 projecting upwards from the plate 22 which supports many of the various operating parts, and this stud assists the connector 10 to disengage from the stud 9 by which it has been pulled outwards. Likewise the rocking shifting action of the connector 10 while it preliminarily carries the inner end of the connector toward the axis of the table B, subsequently permits said inner end 10" to swing outwardly gradually, thereby releasing the pressure of this end from the shifting arm 13 and letting the latter return toward its normal position of Figure 1 from its actuated position of Figure 2, the return of the arm 13 resulting in gentle depositing of the reproducing stylus upon the record A. The operation of the connector 10 in the above manner involves a temporary positioning of the lever 12 in the manner shown clearly in Figure 4 wherein the locking lug 12' of said lever is engaged with the extension 24ª of the timing lever 24. The lug 12' remains in the described engagement with the part 24ª during the entire traverse of the record by the reproducing stylus. Necessarily the traverse of the reproducer of the record involves the customary gradual movement of the tone arm D toward the inner end of the record and during this movement the rigid arm 19 on the pivoted portion of the tone arm moves with the tone arm to shift the actuating lever 23 inwardly at its outer end, thereby causing the timing lever 24 frictionally engaged with said lever 23, to move inwards gradually, in correspondence with the lever 23. At a predetermined time the lug 12' of the locking lever 12 reaches a point opposite the notch 24' of the timing lever 24, whereupon the lug re-enters the notch 24' under the action of a spring 30 attached to the arm 12ª of said lever 12. The shifting of the connector 10 incident to interlocking of the parts 12' and 24 as just mentioned places the flange 10' of the connector in the path of one of the studs 9 of the driver 4, whereupon said driver operates the connector to raise and shift the tone arm D to the point of commencement of reproduction.

According to the foregoing description, a complete cycle of operation of reproduction of a record has been performed and we have heretofore proposed the stopping of the turn table B, and therefore a discontinuance of the reproduction, or the repeating of the operation of the reproduction of the record, on the completion of the traverse of the reproducing stylus over said record. Whether the reproduction is repeated, or entirely discontinued depends upon adjustment of what we call our operation predetermining device, and while in a previous machine of this type devised by us, said actions are effected automatically when the reproducing stylus reaches the inner terminus of the record, in the present machine we have modified our control means to enable the automatic stopping to be effected when the reproducing stylus is at the point of commencement of its reproduction whether for an original reproduction or a repeated reproduction of the record.

Operation predetermining device.

This device is shown best in Figures 6 and 7. As seen at C in Figure 1 we provide a finger piece 31 at the upper end of a turning shaft 32, a pointer 33 being connected to said shaft to cooperate with an indicating dial 34. At the lower end of the shaft 32 said shaft carries a controlling disk 35 having regularly spaced pins 36 thereon and formed with a notch 35' in its periphery. The brake lever G carries a stud 37 adapted to move into the notch 35' of the disk 35 and when received by the notch said stud 37 permits of sufficient movement of the lever G to apply the shoe 1 of the latter to the table B and stop the same. There is connected with the locking lever 12, directly to the arm 12ª of said lever, an operating bar 38 having longitudinal movement through a guide 39 on the under side of the member E. The outer end of the bar 38 is notched and adapted to engage the pins 36 of the disk 35. The relation between the parts 38 and 35 is such that as the reproducing arm D reaches the outer limit of its movement and is lowered to deposit its stylus upon the record the bar 38 will be given a movement sufficient to engage it with one of the pins 36 of the controlling disk 35 to impart an increment of restoring or normalizing movement to said disk. It may be noted that the normal position of the disk 35 which turns with the pointer 33 is such that the pointer 33 is opposite the indication "S" on the dial 34. The dial 34 is supplied with indications running from "0" to "9" inclusive and with the indication "*" and also the indication "S." Under the conditions, therefore, the notch 35' of the disk 35 is opposite the stud 37 when the pointer 33 points to the indication "S." If the pointer 33 is adjusted by the member 31 to point to the indication 1 the machine will be adjusted for a single reproduction of a record thereon or a portion of said record. This reproduction as a cycle may be one in which the reproducer starts from the position substantially that shown in Figure 1, is raised and swung outwards to the position shown in Figure 4, causes actuation of the disk 35 to move the latter one increment back, until the pointer 33 is opposite the indication "0" just as the stylus of the reproducer is deposited on the reproduction commencement point of the record, whereupon the reproducer will traverse the record, will be raised when it reaches the end of the reproduction, and carried outwards again to deposit its stylus upon the record. As soon as the second depositing of the stylus is effected the bar 38 actuates the disk 35, another increment of movement carrying the pointer 33 opposite the indication "S" resulting in bringing the notch 35' of the notch 35 opposite the stud 37 permitting oscillation of the brake lever G and application of the brake to the turn table B, thus stopping the machine. Under the above conditions the bar 38 will be actuated for turning the disk 35 a single increment of movement, as the locking lever 13 moves from the position shown in Figure 3 to the position shown in Figure 4.

It is to be understood, of course, that if the operation predetermining device is set by turning the disk 35 to bring the pointer 33 opposite the indication 5, the machine will go through five repeated reproductions of the record, this being controlled by the fact that six increments of movement have to be imparted to the disk 35, one by each reproduction of the record, in order to render the brake lever G operative to stop the machine.

Means to control reproduction stopping point.

This means comprises the two members 23 and 24 previously described. It is to be observed that when the parts are locked as shown in Figure 1, with a record A in place for reproduction, the timing lever 24 is locked against movement. Thus if the operator grasps the tone arm D he is able to position this tone arm with its reproducing stylus at any point between the outer and inner ends of the record. In doing this he can shift the tone arm across the face of the record in the customary way and during said shifting movement the rigid arm 19 of the tone arm will swing the actuating lever 23 independently of the timing lever 24 owing to the frictional connection between the two.

The point at which the stylus is deposited on the record will constitute always the point where the reproduction will be automatically discontinued preliminary to the raising of the reproducer and carrying of the same outwards to its stopping position if automatic stopping is to be effected, or to its reproduction commencement position if the predetermining device C happens to be set for reproduction action. The fact that the lever 24 is held in its position locked during any manipulation by the operator of the tone arm D to predetermine the inner limit of movement of the reproducing stylus is important because in this manner the locking lug 12' is caused to enter the notch 24' of the timing lever 24, whereby to shift the connector 10 to a position in which its flange 10' may be engaged by the driver 4 under the control of the actuating lever 23. In other words the lever 23 is shiftable relatively to the lever 24 so that the distance which the lever 23 may move during the inward reproducing movement of the arm 10 is variable, but becomes fixed once the reproducer of the arm D has been shifted relatively to the record to the point of deposit thereon at which the reproduction is to cease, whether for stopping or repeating purposes.

In an actual operation, if the tone arm D is manipulated to deposit its stylus on the record A about the middle of this record, the lever 24 remains fixed in its locked position of Figure 1, and the lever 23 is adjusted with its outer end at a very slight acute angle to the lever 24. Under these conditions, when the parts 23 and 24 move together after the latter is free from the locking lever 12 it will be obvious that the notch 24' will be shifted on outward movement of the tone arm by the automatic means a less distance away from the lug 12' than if the preliminary point of deposit of the stylus had been practically at the inner end of said record. It is this variability in the relative positioning of the parts 23 and 24 that increases or decreases as the case may be the time required, on the inward movement of the tone arm D, for the locking lug 12' to reach the notch 24', on entering which the connection between the connector 10 and the driver is effected. The stopping or repeating action of the reproducer, of course, follows this connection.

*The reproduction commencement point controller and indicator.*

This device is a very simple construction and as seen at F in the drawing consists of an angular shaped lever 39 pivotally supported at 40 intermediate the end of one of its arms, said arm being bifurcated to receive a pin 41 on a lever 42. The lever 42 is pivoted at 43 and has a pin 44 entering a slot 45 in the slide 26. By shifting the control lever 39 the lever 42 may be rocked to shift the slide or plate 26 pivotally about its pivot 26' thereby varying the distance between the stud 25 of said slide and the inner curved end of the lever 23. The distance between the stud 25 and the inner curved end of the lever 23 controls the extent to which the lever 23 is capable of moving the tone arm D in an outward direction, the greater said distance the less the movement, and vice versa.

This understood, it will be apparent that the controller 39 may be equipped at its outer end with the main indicating pointer 39$^a$ and the auxiliary indicating pointer 39$^b$, and these pointers are arranged so as to readily overlap the table B and the record A thereon. By shifting the lever 39 so that one of the pointers just mentioned is opposite a certain portion of the record reproducing groove, the stud 25 of the slide 26 may be adjusted so that the stylus of the arm D will be deposited in the groove substantially at the point opposite the end of the particular pointer used. In other words, the relative arrangement of the stud 25 and the lever 23, and the pointers of the controller or lever 39 is empirically determined in such a manner that the parts 25 and 23 will cooperate always to cause depositing of the stylus of the tone arm D in the record groove at a distance from the center of the record equal to the distance between the extremity of the pointer and the center of said record. The pointer 39$^a$ is used as the indicating element when the reproducer is adjusted for use on a hill and dale record, and the pointer 39$^b$ when the reproducer is adjusted to change the position of the stylus for use on lateral ditch records.

The controller F is especially advantageous because it is a visual indicator, practically speaking, adapted to advise the operator of the exact point where the reproduction will commence, once the operative pointer of the indicating and controlling lever 39 is adjusted as it may be to any desired point across the face of the record. In fact the member 39 is intended to be flexible so as to yield downwards practically to the point of touching of the record if necessary in order to facilitate accurate positioning of the indicator. An especial advantage of the controller F resides also in the fact that it may be moved at any time after the reproduction has commenced to change its position so that the operator can thus predetermine the point of commencement of reproduction for repeat operations of the machine, set the indicator or controller at such point and leave the machine at once knowing that it will take care of itself from then on to perform its reproducing functioning.

In Figure 8 is illustrated a controller and indicator F' adapted to perform the same function as the lever 39 in the above described construction, said controller coacting with two sets of indicia on a dial plate 46, one set of indicia applying to the adjustment of the reproducer when used for a hill and dale record, and the other set of indicia being used for adjustment of the controller when a lateral ditch record is employed. The purpose in using two pointers 39$^a$ and 39$^b$ according to the preferred construction of the controller F is to enable the controller to be adjusted also for the two different kinds of records, one pointer being used for the lateral ditch type and the other pointer for the hill and dale type.

There is provided a spring 47 connecting the lever 24 and the lever 12 at the arm 12$^a$ of the latter. This spring is expanded incident to the shifting outwards of the tone arm and therefore exerts a pull on the tone arm through the levers 24 and 23 such that if the stylus is deposited on the smooth portion of the record A at its outer periphery there will be a slight pulling tension on the arm D, so to speak, which in the course of a few seconds will carry the stylus on to the reproducing track of the record. The spring 47 exerts practically a constant tension to pull the tone arm inwardly, its particular advantage being, however, incident to the action just above referred to.

The spring 30 which has been previously described, acts upon the lever 12 to move said lever bodily with the connector 10 when the later is disengaged from the pins 9 of the driver 4, as well as to carry the lug 12 into the notch 24'. Additionally, the spring 30 holds the lug 12' in proper engagement with the extension 24$^a$ of the lever 24.

It will be apparent that if the operator has set the predetermining device C for a certain number of reproductions of the record, leaves the machine, and returns to the machine, by consulting the pointer 33 in its relation to the dial 34 he will be enabled to determine by mental subtraction how many reproductions have been performed, under which conditions the member C is obviously a registering device.

With the present machine any particular portion of a record placed upon the table B, may be reproduced one or more times within the capacity of the device C. Likewise the disk 35 has one of the pins 36, that is regularly provided, omitted therefrom, so that the pointer 33 may be turned to the indication "*," thereby positioning the disk so that the operating bar 38 will not affect it in any way, whereby continuous operation of a record indefinitely may be secured.

It is obvious that when the reproducer or tone arm D is stopped in a position at the point of commencement of reproduction of the record, the reproducing stylus has assumed a position in which a minimum amount of risk of record scratching attends the lifting and resetting of the stylus in the operation of changing records.

The timing lever 24 is preferably a lever, of course, but it is contemplated within the purview of this invention to substitute for this lever any equivalent part such as a slide or the like, and the claims hereafter appended should be interpreted in this light.

In respect to the modification in Figures 9 and 10, it may be noted that the tone or reproducer arm D carries a fixed L-shaped arm 50 the lower portion of which (see Figure 11) engages in a slot 51 of the lever 52 which is frictionally connected at 53 by a member similar to the member 14 previously described, with the timing lever 54. The lever 54 has the notch 55 and the extension 54$^a$ and is therefore similar in its form to the lever 24 of the described construction. Coacting with the lever 54 is an operating arm 56 projecting from the brake lever 57. The lever 57 has the brake shoe 58 cooperative with the record carrier and the arm 56 has a lug 59 adapted to enter the notch 55 and likewise arranged so that the extension 54$^a$ may operate in engagement therewith. A spring 60 tends to pull the operating arm 56 toward the member 54 and the action of the parts is very simple. While the parts are in the position shown in full lines in Figure 9 the timing lever 54 is held against movement and the reproducer D is adapted to be set manually to a reproduction discontinuance point. This done, the operator may grasp the handle 61 of the brake lever 57, move said lever to release the carrier B, and then lift the reproducer D and carry it to any desired reproduction commencement point. Thereupon the lever 57 may be released and will be held in released position because on moving the reproducer D to the reproduction commencement point the extension 54$^a$ of the lever 54 was brought into play to coact with the lug 59. Owing to the frictional connection between the parts 52 and 54 as the reproducer D was carried to its reproduction commencement position, the lever 54 was caused to be moved thereby a predetermined distance, and furthermore as the reproducer D moves to its reproduction discontinuance point already predetermined the timing lever 54 moves therewith and on reaching said point the lug 59 enters the notch 55 and the brake shoe 58 is automatically applied to discontinue reproduction in an obvious manner.

As shown in Figure 11 the reproducer has been deposited on the record A and is ready to travel back to the reproduction point, the carrier B being free.

Having thus described the invention, what is claimed as new is:—

1. In a sound reproducing machine, the combination of a record carrier and reproducing means, of a controller cooperative with a record on the carrier for predetermining the point of commencement of reproduction of the record by said reproducing means, and automatic instrumentalities to shift the reproducing means to a point of commencement of reproduction of the record under the control of said controller.

2. In a sound reproducing machine, the combination with a record carrier and reproducing means, of a controller cooperative with a record on the carrier for predetermining the point of commencement of reproduction by said reproducing means, and a mechanism under control of the controller to move the reproducing means to the point of commencement of reproduction and cause discontinuance of reproduction when the last means reaches said point.

3. In a sound reproducing machine, the combination with a record carrier and reproducing means, of a controller cooperative with a record on the carrier for predetermining the point of commencement of reproduction by said reproducing means, the controller constituting an indicator shiftable across the reproducing surface of the record and adapted to be pressed close to said surface to contact with the latter in performing its indicating function.

4. In a sound reproducing machine, the combination of a record carrier and reproducing means, of a controller cooperative with a record on the carrier for predetermining the point of commencement of reproduction of the record by said reproducing means, and automatic instrumentalities to shift the reproducing means to a point of commencement of reproduction of the record adjustable by movement of the controller.

5. In a sound reproducing machine, the combination of a record carrier and reproducing means, of a controller cooperative with a record on the carrier for predetermining the point of commencement of reproduction of the record by said reproducing means, and automatic instrumentalities to shift the reproducing means to a point of commencement of reproduction of the record adjustable by movement of the controller, the controller including a visible indicating pointer cooperative with the surface of a record on the carrier to indicate the precise point on the record where sound reproduction will begin in the operation of the machine.

6. In a sound reproducing machine, the combination with a record carrier and reproducing means associated therewith, of general controlling mechanism for causing one or more reproductions of the record, including an operation predetermining device, and means enabling its movement in opposite directions to assume a predetermining adjustment.

7. In a sound reproducing machine, the combination with a record carrier and reproducing means associated therewith, of general controlling mechanism for causing one or more reproductions of the record, including a rotary operation predetermining device, and means enabling its rotation in opposite directions to assume a predetermining adjustment.

8. In a sound reproducing machine, the combination with a record carrier and reproducing means associated therewith, of general controlling mechanism for causing one or more reproductions of the record, including an operation predetermining device movable in opposite directions to assume a predetermining adjustment, and means to cause said predetermining device to register each separate reproduction of the record.

9. In a sound reproducing machine, the combination with a record carrier and reproducing means associated therewith including a tone arm, a driver, a connector, means to engage the connector with the driver to operate the latter therefrom, a connection intermediate the connector and tone arm to raise the arm on operation of the connector, and lever mechanism variably operable also by the connector to shift the tone arm outwards when the arm is raised.

10. In a sound reproducing machine, the combination with a record carrier and reproducing means associated therewith, including a tone arm, a driver, a connector, means to engage the connector with the driver to operate the latter therefrom, a connection intermediate the connector and the tone arm to raise the arm on operation of the connector, and lever mechanism including a lever connected to the tone arm to move the latter outwardly, a member connected to said connector adapted to shift the lever when the connector is actuated by the driver, and means to vary the time of coaction of said member with the lever to thereby vary the extent of movement of the tone arm by the lever.

11. In a sound reproducing machine, the combination with a record carrier and reproducing means associated therewith, including a tone arm, a driver, a connector, means to engage the connector with the driver to operate the latter therefrom, a connection intermediate the connector and the tone arm to raise the arm on operation of the connector, and lever mechanism including a lever connected to the tone arm to move the latter outwardly, a member connected to said connector adapted to shift the lever when the connector is actuated by the driver, means to vary the time of coaction of said member with the lever to thereby vary the extent of movement of the tone arm by the lever, and means to cause one or more engagements of the connector with the driver.

12. In a sound reproducing machine, the combination with a record carrier and reproducing means associated therewith, including a tone arm, a driver, a connector, means to engage the connector with the driver to operate the latter therefrom, a connection intermediate the connector and the tone arm to raise the arm on operation of the connector, lever mechanism including a lever connected to the tone arm to move the latter outwardly, a member connected to said connector adapted to shift the lever to thereby vary the extent of movement of the tone arm by the lever, and means to discontinue movement of the tone arm when it reaches the limit of its outward movement under the influence of the said lever.

13. In a sound reproducing machine, the combination with a record carrier and reproducing means associated therewith including a tone arm, a driver, a connector, means to engage the connector with the driver to operate the latter therefrom, a connection intermediate the connector and the tone arm to raise the arm on operation of the connector, lever mechanism including a lever connected to the tone arm to move the latter outwardly, a member connected to said connector and having a stud to engage and shift the lever when the connector is actuated by the driver, and means to vary the distance between said stud and the lever.

14. In a sound reproducing machine, the combination with a record carrier and reproducing means associated therewith including a tone arm, a driver, a connector, means to engage the connector with the driver to operate the latter therefrom, a connection intermediate the connector and the tone arm to raise the arm on operation of the connector, lever mechanism including a lever connected to the tone arm to move the latter outwardly, a member connected to said connector and having a stud to engage and shift the lever when the connector is actuated by the driver, and means to vary the distance between said stud and the lever comprising a controller manually adjustable to predetermine the point at which the reproducing means coacts with a record on the carrier to commence reproduction.

15. In a sound reproducing machine, the combination with a record carrier, and a reproducer adapted to traverse a record on said carrier, of an actuating lever for moving the reproducer to a reproduction commencement point on the record, an operation control member connected to said lever to move therewith, and means whereby the lever may move independently of the operation control member to obtain a desired relative adjustment of the two.

16. In a sound reproducing machine, the combination with a record carrier, and a reproducer adapted to traverse a record on said carrier, and adapted for manual adjustment to a reproduction discontinuing position, means to automatically move the reproducer, a timing device for setting said automatic means to work after a predetermined amount of movement of the reproducer, and means to lock said timing device during manipulative adjustment of the reproducer, the timing device being supported independently of the reproducer.

17. In a sound reproducing machine, the combination with a record carrier, and a reproducer adapted to traverse a record on said carrier, and adapted for manual adjustment to a reproduction discontinuing position, means to automatically move the reproducer, a timing device for setting said automatic means to work after a predetermined amount of movement of the reproducer, and means to lock said timing device during manipulative adjustment of the reproducer, the timing device being supported independently of the reproducer and consisting of a part movable with and independently of the reproducer.

18. In a second reproducing machine, the combination with a record carrier, and a reproducer adapted to traverse a record on said carrier, and adapted for manual adjustment to a reproduction discontinuing position, means to automatically move the reproducer, a timing device for setting said automatic means to work after a predetermined amount of movement of the reproducer, means to lock said timing device during manipulative adjustment of the reproducer, the timing device being supported independently of the reproducer, and consisting of a lever lockingly engageable by the locking means when the reproducer is undergoing manipulation, and means to release the said lever when the automatic means is set to work.

19. In a sound reproducing machine, the combination with a record carrier, and a reproducer adapted to traverse a record on said carrier, and adapted for manual adjustment to a reproduction discontinuing position, means to automatically move the reproducer, a timing device for setting said automatic means to work after a predetermined amount of movement of the reproducer, means to lock said timing device during manipulative adjustment of the reproducer and consisting of a timing lever held stationary by the locking means during manipulative movement of the reproducer, the automatic means including an actuating lever for the reproducer, and means connecting said levers for simultaneous and independent movement.

20. In a sound reproducing machine, the combination with a record carrier, and a reproducer adapted to traverse a record on said carrier, and adapted for manual adjustment to a reproduction discontinuing position, means to automatically move the reproducer, a timing device for setting said automatic means to work after a predetermined amount of movement of the reproducer, means to lock said timing device during manipulative adjustment of the reproducer and consisting of a timing lever held stationary by the locking means during manipulative movement of the reproducer, the automatic means including an actuating lever for the reproducer, and means connecting said levers to move together when the automatic means is set to work and permitting relative movement of the levers when the reproducer is undergoing adjustment to reproduction discontinuing position.

21. In a sound reproducing machine the combination with a record carrier and a reproducer adapted to operate on a record supported on said carrier, automatic means for actuating the reproducer to set the same in reproduction commencement position, said means embodying a driver, a connector, an operation predetermining device to connect the connector with the driver, means for actuating the reproducer to carry the same to reproduction starting position including an arm operable by said connector, an actuating lever permanently connected with the reproducer, a second lever connected with the connector, and a member attached to said second lever and having means to engage and operate the actuating lever.

22. In a sound reproducing machine, the combination with a record carrier and a reproducer adapted to operate on a record supported on said carrier, automatic means for actuating the reproducer to set the same in reproduction commencement position, said means embodying a driver, a connector, an operation predetermining device to connect the connector with the driver, means for actuating the reproducer to carry the same to reproduction starting position including an arm operable by said connector, an actuating lever permanently connected with the reproducer, a second lever connected with the connector, a member attached to said second lever and having means to engage and operate the actuating lever, and means to adjust the engaging means of the last mentioned member to vary the movement of the actuating lever under the influence of said engaging means.

23. In a sound reproducing machine, the combination with a record carrier and a reproducer adapted to operate on a record supported on said carrier, automatic means for actuating the reproducer to set the same in reproduction commencement position, said means embodying a driver, a connector, an operation predetermining device to connect the connector with the driver, means for actuating the reproducer to carry the same to reproduction starting position including an arm operable by said connector, an actuating lever permanently connected with the reproducer, a second lever connected with the connector, a member attached to said second lever and having means to engage and operate the actuating lever, means to adjust the engaging means of the last mentioned member to vary the movement of the actuating lever under the influence of said engaging means, and a reproduction commencement point controller arranged to operate said adjusting means.

24. In a sound reproducing machine, the combination with a record carrier and a reproducer adapted to operate on a record supported on said carrier, automatic means for actuating the reproducer to set the same in reproduction commencement position, said means embodying a driver, a connector, an operation predetermining device to connect the connector with the driver, means for actuating the reproducer to carry the same to reproduction starting position including an arm operable by said connector, an actuating lever permanently connected with the reproducer, a second lever connected with the connector, and a locking member attached to said connector and having means to cooperate with the actuating lever to move the latter for shifting the reproducer, and a timing lever connected with said actuating lever, and adapted to be locked by said locking lever to prevent movement of the timing lever with the actuating lever, and to be released to permit movement of the timing lever with said actuating lever.

25. In a sound reproducing machine, the combination with a record carrier and a reproducer adapted to operate on a record supported on said carrier, automatic means for actuating the reproducer to set the same in reproduction commencement position, said means embodying a driver, a connector, an operation predetermining device to connect the connector with the driver, means for actuating the reproducer to carry the same to reproduction starting position including an arm operable by said connector, an actuating lever permanently connected with the reproducer, a second lever connected with the connector, a locking member attached to said connector and having means to cooperate with the actuating lever to move the latter for shifting the reproducer, a timing lever connected with said actuating lever and adapted to be locked by said locking lever to prevent movement of the timing lever with the actuating lever and to be released to permit movement of the timing lever with said actuating lever, the reproducer being manually settable to a reproduction discontinuing point with respect to the record whilst the locking lever locks the timing lever, whereby to obtain a predetermined relative adjustment of the timing and actuating levers.

26. In a sound reproducing machine, the combination with a record carrier and a reproducer adapted to operate on a record supported on said carrier, automatic means for actuating the reproducer to set the same in reproduction commencement position, said means embodying a driver, a connector, an operation predetermining device to connect the connector with the driver, means for actuating the reproducer to carry the same to reproduction starting position including an arm operable by said connector, an actuating lever permanently connected with the reproducer, a second lever connected with the connector, a locking member attached to said connector and having means to cooperate with the actuating lever to move the latter for shifting the reproducer, a timing lever connected with said actuating lever and adapted to be locked by said locking lever to prevent movement of the timing lever with the actuating lever and to be released to permit movement of the timing lever with said actuating lever, the reproducer being manually settable to a reproduction discontinuing point with respect to the record whilst the locking lever locks the timing lever, whereby to obtain a predetermining relative adjustment of the timing and actuating levers, the timing lever being provided with an extension whereby to hold the locking lever in an inactive position relative to the timing lever until the reproducer reaches the reproduction discontinuing point aforesaid.

27. In a sound reproducing machine, the combination of a record carrier and a reproducer adapted to traverse a record on said carrier, a driving mechanism including the driver 4 and the connector 10, reproducer actuating means including the arm 13 and the lever 23 permanently connected with the reproducer and operable from the driver, timing and locking means including the locking lever 12 and the timing lever 24, the former having the member 12' to lock the member 24, and the connection 26 between the locking lever 12 and the lever 23.

28. In a sound reproducing machine, the combination of a record carrier and a reproducer adapted to traverse a record on said carrier, a driving mechanism including the driver 4 and the connector 10, reproducer actuating means including the arm 13 and the lever 23 permanently connected with the reproducer and operable from the driver, timing and locking means including the locking lever 12 and the timing lever 24, the former having the member 12' to lock the member 24, the connection 26 between the locking lever 12 and the lever 23, and a connection intermediate the lever 23 and the timing lever 24 whereby the former is movable independently of the latter when the locking lever 12 locks the lever 24, and whereby the parts 23 and 24 may move together when the lever 24 is released from the lever 12.

29. In a sound reproducing machine, the combination of a record carrier and a reproducer adapted to traverse a record on said carrier, a driving mechanism including the driver 4 and the connector 10, reproducer actuating means including the arm 13 and the lever 23 permanently connected with the reproducer and operable from the driver, timing and locking means including the locking lever 12 and the timing lever 24, the former having the member 12' to lock the member 24, the connection 26 between the locking lever 12 and the lever 23, and a connection intermediate the lever 23 and the timing lever 24 whereby the former is movable independently of the latter when the locking 12 locks the lever 24, and whereby the parts 23 and 24 may move together when the lever 24 is released from the lever 12, the reproduction commencement point controller 39 operatively connected with the member 26 to adjust the latter in relation to the lever 23 and the operation predetermining device for causing cooperation of the driver 4 with the connector 10, and the connection 38 intermediate the locking lever 12 and said predetermining device for controlling the latter.

30. In a sound reproducing machine, the combination with a record carrier and a reproducer cooperative with a record disposed thereon, of reproduction stop means for said reproducer, a timing device supported independently of the reproducer and movable therewith during reproducing action of the same, and locking means for said timing device to hold the same stationary while the stop means is operative.

31. In a sound reproducing machine, the combination with a record carrier and a reproducer cooperative with a record disposed thereon, of reproduction stop means for said reproducer, a timing device supported independently of the reproducer and movable therewith during reproducing action of the same, and locking means for said timing device to hold the same stationary while the stop means is operative, and operable to release the timing device so that it may move with the reproducer when the latter is traversing the record.

32. In a sound reproducing machine, the combination with a record carrier and a reproducer cooperative with a record disposed thereon, said reproducer being adapted to be set by hand to a point of coaction with a record to thereby initially predetermine its reproduction discontinuance point, reproduction discontinuing means, and a timing device supported independently of the reproducer but adapted to move therewith during reproducing action of the same, and means intermediate said timing device and the discontinuing means for holding the timing device in a certain position during the initial setting of the reproducer, operable to free the timing device to move with the reproducer as the latter reproduces sound, and to cause effective action of the discontinuing means when the timing device reaches the certain position aforesaid while moving with the reproducer.

33. In a sound reproducing machine, the combination with a record carrier and a reproducer cooperative with a record disposed thereon, said reproducer being adapted to be set by hand to a point of coaction with a record to thereby initially predetermine its reproduction discontinuance point, reproduction discontinuing means, and a timing device supported independently of the reproducer but adapted to move therewith during reproducing action of the same, and means intermediate said timing device and the discontinuing means for holding the timing device in a certain position during the initial setting of the reproducer, and operable to free the timing device to move with the reproducer as the latter is carried to a reproduction commencement point and to also thereafter move with the reproducer as the latter reproduces sound, and to cause effective action of the discontinuing means when the timing device reaches the certain position aforesaid while moving with the reproducer.

34. In a sound reproducing machine, the combination with a record carrier and a reproducer cooperative with a record disposed thereon, of reproduction discontinuing means for said reproducer, a timing device supported independently of the reproducer and movable therewith during reproducing action of the same, and locking means for said timing device to hold the same stationary while the discontinuing means is operative.

In testimony whereof we affix our signatures.

CLIFFORD C. BROOKS.
EDWIN O. KLEMM.